US007559027B2

(12) United States Patent
Berkowitz et al.

(10) Patent No.: US 7,559,027 B2
(45) Date of Patent: Jul. 7, 2009

(54) MASTER MULTIMEDIA SOFTWARE CONTROLS

(75) Inventors: David Berkowitz, Palo Alto, CA (US); Matthew W. Crowley, Los Altos, CA (US); Keith Saft, San Francisco, CA (US)

(73) Assignee: Palm, Inc., Sunnyvale, CA (US)

( * ) Notice: Subject to any disclaimer, the term of this patent is extended or adjusted under 35 U.S.C. 154(b) by 354 days.

(21) Appl. No.: 11/365,985

(22) Filed: Feb. 28, 2006

(65) Prior Publication Data

US 2007/0204225 A1 Aug. 30, 2007

(51) Int. Cl.
*G06F 3/00* (2006.01)
(52) U.S. Cl. ...................... 715/719; 715/746
(58) Field of Classification Search ........................ None
See application file for complete search history.

(56) References Cited

U.S. PATENT DOCUMENTS

| 5,428,730 | A | | 6/1995 | Baker et al. |
| 5,553,222 | A | * | 9/1996 | Milne et al. ................. 715/201 |
| 6,127,941 | A | | 10/2000 | Van Ryzin |
| 6,560,707 | B2 | | 5/2003 | Curtis et al. |
| 6,772,355 | B2 | | 8/2004 | Homewood et al. |
| 7,047,092 | B2 | * | 5/2006 | Wimsatt ..................... 700/83 |
| 7,360,152 | B2 | * | 4/2008 | Capps et al. ................. 715/201 |
| 7,386,784 | B2 | * | 6/2008 | Capps et al. ................. 715/203 |
| 2002/0070960 | A1 | | 6/2002 | Maine et al. |
| 2002/0082730 | A1 | * | 6/2002 | Capps et al. .................. 700/94 |
| 2002/0103821 | A1 | | 8/2002 | Nikolovska et al. |
| 2002/0113812 | A1 | | 8/2002 | Walker et al. |
| 2004/0066397 | A1 | | 4/2004 | Walker et al. |
| 2004/0148362 | A1 | * | 7/2004 | Friedman .................... 709/217 |
| 2005/0081155 | A1 | * | 4/2005 | Martin et al. ................ 715/719 |
| 2005/0165843 | A1 | * | 7/2005 | Capps et al. ............. 707/104.1 |

OTHER PUBLICATIONS

Judith Stern and Robert Lettieri, "Quicktime 5 for Macintosh and Windows: Visual quickstart Guide"; Copyright Date: Jun. 27, 2001.*
Windows Media Player. Copyright Date: 2004.*

* cited by examiner

*Primary Examiner*—Doug Hutton
*Assistant Examiner*—Soumya Dasgupta
(74) *Attorney, Agent, or Firm*—Fenwick & West LLP

(57) ABSTRACT

A software control mechanism is disclosed for use with a plurality of media applications. The software control mechanism comprises a media control panel structured for use with a plurality of media applications. The media control panel is independent of each media application. Each media application is displayed within a computer screen. The software control mechanism is structured to control a function of a presently interfaced media application on the display screen. Further, as the presently interfaced media application changes on the display screen, the media control panel for that media application is displayed along a same boundary of the computer screen.

22 Claims, 5 Drawing Sheets

MASTER MULTIMEDIA SOFTWARE CONTROLS

BACKGROUND

1. Field of Art

The present invention generally relates to the field of multimedia devices, and more specifically, to a software configured multimedia control mechanism.

2. Description of the Related Art

Software control mechanisms for conventional software multimedia players are known. Conventionally, a multimedia application executes within a conventional multimedia player window. When a multimedia application is selected, the conventional multimedia player launches somewhere on a user's computer screen and a user must then look at the multimedia player to determine where the control buttons are to control functionality of the multimedia application. Thus, a lack of consistent placement of control mechanisms for a multimedia player on a computer screen results in lost productivity from a user having to search for those mechanisms.

Further complicating matters, conventional software multimedia players are rigid with respect to their control mechanisms. The control mechanisms remain the same regardless of the presently executing multimedia application. The control mechanism stays the same for a video multimedia application, a photo album multimedia application, or a voice recorder multimedia application despite changing functionality. Thus, a user is not presented with a control mechanism that is structured to be intuitive for a user. Instead, a user is required to know which buttons on the multimedia player correspond to which control functions for the multimedia application: In turn, rather than simplifying user interactions, conventional systems add to user confusion because of their rigidity and inability to present users with more intuitive user interfaces.

From a multimedia application developer's perspective, having a more configurable control mechanism for products increases user satisfaction and helps increase usage. However, most application developers must conform to the rigid specifications of the established multimedia players. Alternatively, the application developers can create their own custom designed device control screens as well as handle all user interactions, device communications, and screen changes. However, such approaches are time consuming and costly for application developers.

Thus, from the above there is a need for a system and process for a master multimedia control mechanism that (1) provides a consistency of presentation location on a computer screen, (2) is flexible with respect to function control mechanisms provided, and (3) provides application developers application programming interfaces that allow for some customization of assignment of functional control relative to control mechanisms.

SUMMARY

In one embodiment a software control mechanism is structured for use with a plurality of media applications. The software control mechanism comprises a media control panel structured for use with two or more media applications. In one embodiment, the media control panel is independent of the two or more media applications. Each media application is displayed within a computer screen. The software control mechanism is structured to control a function of a presently interfaced media application on the display screen. Further, as the presently interfaced media application changes on the display screen, the media control panel for that media application is displayed along a same boundary (or location) of the computer screen. It is noted that presently interfaced included an application a user is presently interacting with and is visible.

By way of example, a handheld computing device having a display screen may be configured to execute a video playback application and a voice recorder application, each of which are example media applications. The presently interfaced media application is the application with which a user is presently performing a function. For example, when a user is playing the video and exercising function control over that video that is the presently interfaced (visible) media application. Likewise, by way of example, if the user then switches to the voice recorder application and inputs a voice memo, the voice recorder application is the media application being presently interfaced (visible).

A media control panel is configured to display a one or more buttons to a user. The buttons may be structured to function with touch sensitive or inductive pen computer screens so that when the buttons are "touched" or "selected", the function corresponding to that button is executable or executed. Functionality can be associated with the one or more buttons through an application programming interface (API) that maps a function or functions from a media application to a particular button or buttons. In one embodiment, the functions associated with the one or more buttons changes as the presently interfaced media application changes. In addition, the media control panel is configured to be consistently displayed along a same boundary (or location) of a computer screen even as the functionality of its particular button or buttons changes with a change of the presently interfaced application.

The present invention provides a benefit of having a consistent user interface for control over media applications, which provides ease of understanding and use with respect to each media application. In addition, it relieves programmers of media control applications from the burdens of designing and placing media control panels with their developed media application because the media control panel is independent of the media application. Thus, the application program need only assign functionality to the particular buttons through the appropriate API to associate functionality of the media player with particular buttons on the media control panel.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF DRAWINGS

The disclosed embodiments have other advantages and features which will be more readily apparent from the following detailed description and the appended claims, when taken in conjunction with the accompanying drawings, in which:

DETAILED DESCRIPTION

The Figures (FIGS.) and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments, examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles described herein.

Overview of Multimedia Control Mechanism Architecture

Generally, the disclosed embodiments describe a master multimedia control mechanism that is uniform across a broad array of application operating on a computing device. A computing device is any device structured to execute software enabled multimedia applications. In one embodiment, the master multimedia control mechanism (panel) is software enabled. In addition, examples of computing devices include personal computer systems, laptop or notebook computer systems, and handheld computer devices. Examples of a handheld computer device includes a personal digital assistant (PDA), a smartphone, multimedia enabled phone, multimedia enabled devices (e.g., the iPod from Apple Computer Systems, Inc., the Zen from Creative Laboratories, Inc., or the PSP from Sony Corporation).

Figure 1A:
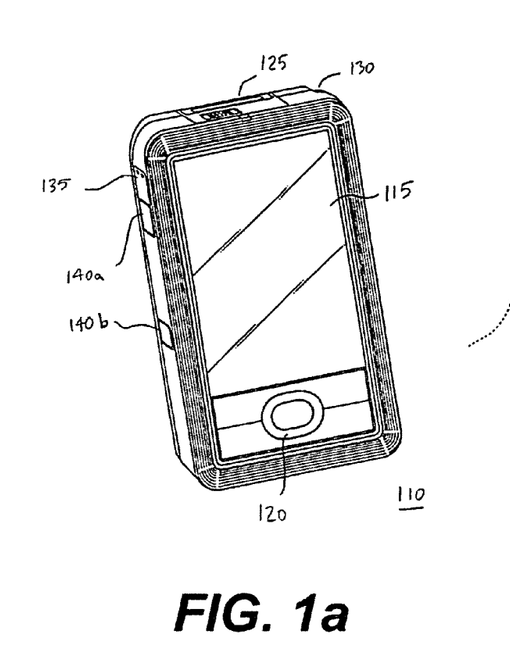
FIGS. 1a through 1c illustrate embodiments of a handheld computing device in accordance with the present invention.
Figure 1B:
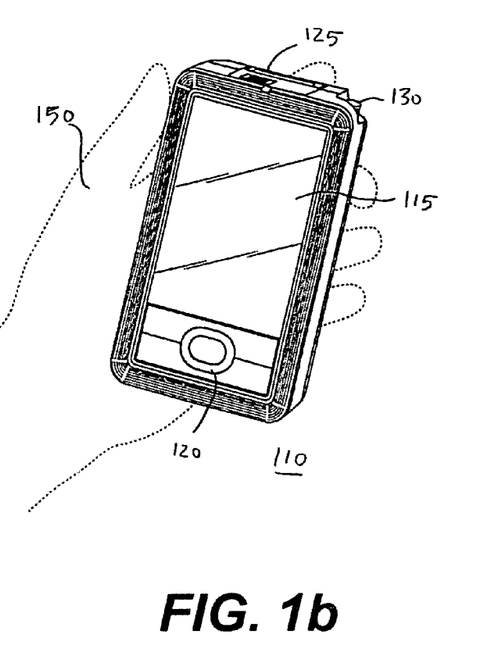
Figure 1C:
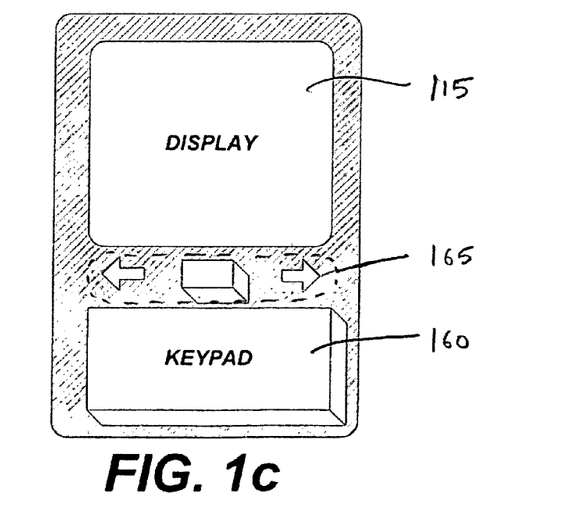

FIGS. 1a through 1c illustrate embodiments of a handheld computing device 110 in accordance with the present invention. As illustrated in FIG. 1b, the handheld computing device 110 is configured to be of a form factor that is convenient to hold in a user's hand, for example, a personal digital assistant (PDA) or a smart phone form factor. For example, the handheld computing device 110 can have dimensions that range from 3 to 6 inches by 2 to 5 inches by 0.25 to 0.85 inches and weigh between 3 and 7 ounces. FIG. 1c illustrates an embodiment in which a numeric (e.g., dialpad) or alpha or alphanumeric keypad 160 (e.g., QWERTY keyboard) may be integrated with the handheld computing device 110. The embodiment in FIG. 1c also includes a navigation area 165 for controlling functions on the display screen, e.g., cursor movement, selection, and the like, through mechanical or solid state switches, dials, or a combination thereof.

Referring to back to FIG. 1a, the handheld computing device 110 includes a screen (or display) 115, a screen navigation interface 120, an expansion port (or slot) 125, a stylus 130, a microphone 135, and one or more control buttons, e.g., voice recorder button, screen rotation button, etc., 140a, b (generally 140). The screen is, for example, a 240×240, a 320×320, or a 320×480 transflective TFT color display that includes touch screen or inductive pen support. The expansion slot 125 is configured to receive and support expansion cards (or media cards) that include memory cards such as CompactFlash™ cards, SD cards, XD cards, Memory Sticks™, MultiMediaCard™, SDIO, and the like. Further, the screen navigation interface 120, the stylus 130, the microphone 135, and the one or more control buttons 140 are conventional, although various functions can be applied to them. Again, it is noted that in a keyboard 160 may be integrated as illustrated in FIG. 1c.

Figure 2:
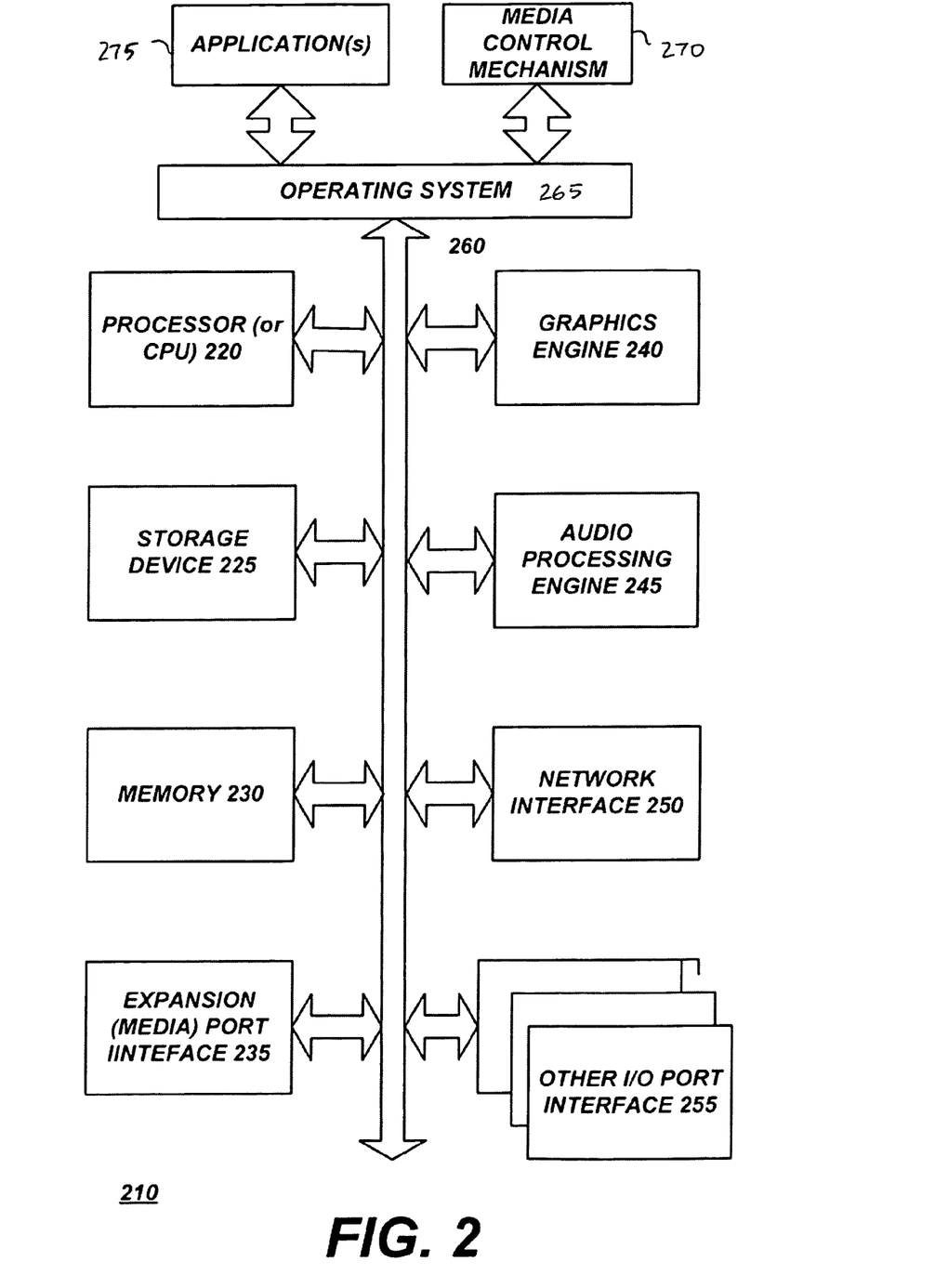
FIG. 2 illustrates one embodiment of an architecture for a software configured master multimedia control mechanism panel in accordance with the present invention.

Turning to FIG. 2, illustrated is one embodiment of a computing architecture 210 of the handheld computing device 110 in accordance with the present invention. The architecture 210 includes a processor (or CPU) 220, a storage device 225, a memory 230, an expansion (or media) port interface 235, an optional graphics engine 240, an audio processing engine 245, a network interface 250, and one or more other input/output (I/O) port interfaces 255. Each of the components of the computing architecture may communicatively couple through a data bus 260.

In addition, the architecture 210 also includes an operating system 265 that interfaces with the components of the computing architecture. A media control mechanism (or panel) is configured to interact with the operating system 265. Likewise one or more applications 275 are configured to communicate with the operating system 265. The media control mechanism 270 and the applications 275 are communicatively coupled, for example, thought the operating system, and the applications 275 can access the media control mechanisms through an application programming interface. The media control mechanisms 270 are configured to provide functional control relative to media applications as further described herein.

The processor 220 is a conventional processor or controller such as an Intel® XScale™ processor. The storage device 225 is a conventional long term storage device, for example, a hard drive (e.g., magnetic hard drive) or a flash memory drive. The memory 230 is a conventional computing memory such as a random access memory (RAM). The expansion port interface 235 is configured to interface with a media card such as the ones previously described. The optional graphics engine 240 may include hardware, e.g., graphics chip, in addition to software to enhance graphics for display on the screen 115.

The audio processing engine 245 is configured for audio related processing such as recording and playback. The audio processing engine 245 includes appropriate hardware (e.g., microphone, speaker, and/or ports (or jacks)) and software (e.g., sound controls) to achieve such functionality. The network interface 250 is configured for network connections to a wide range of networks and includes appropriate hardware and software to communicatively couple to such networks. Examples of networks that can be configured to function with the handheld computing device 110 include personal area networks (e.g., Bluetooth), wireless networks (e.g., IEEE 802.11), and telecommunications networks (e.g., cellular or data). The one or more other I/O ports 255 include interfaces for connections such as universal serial bus (USB), IEEE 1394 (e.g., FireWire), and the like.

In addition, it is noted that the handheld computing device 110 is configured to use conventional operating systems such as Palm OS®) from ACCESS Co. Ltd (Tokyo, Japan) or Windows Mobile from Microsoft® Corporation (Redmond, Wash.). It is noted that the device can also be configured for use with other operating systems, for example, Linux-based operating systems.

Application of Master Multimedia Control Mechanism

Figure 3A:
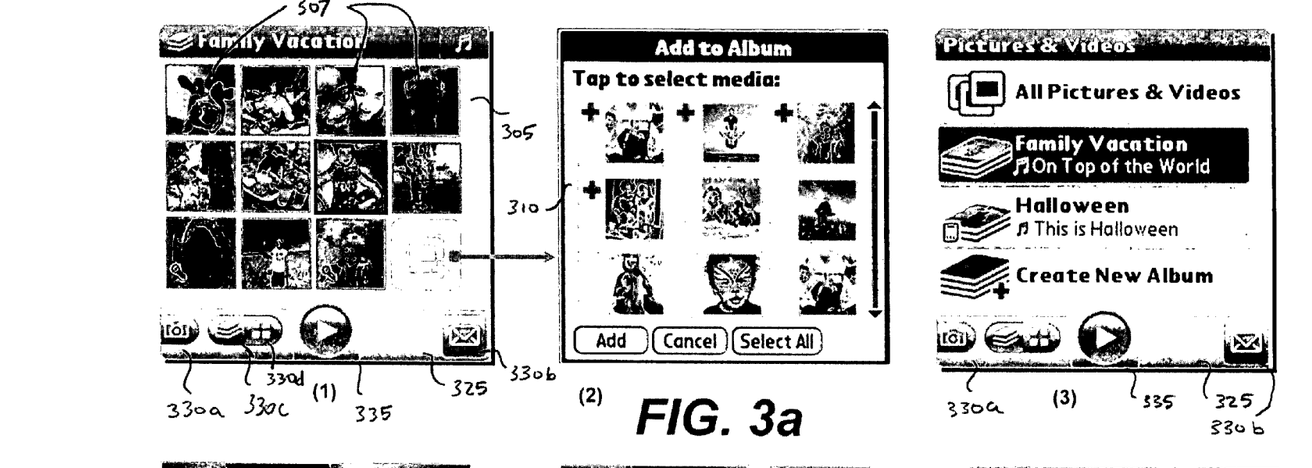
FIGS. 3a and 3b illustrate one embodiment of a master multimedia control mechanism for use with a picture album application in accordance with the present invention.
Figure 3B:
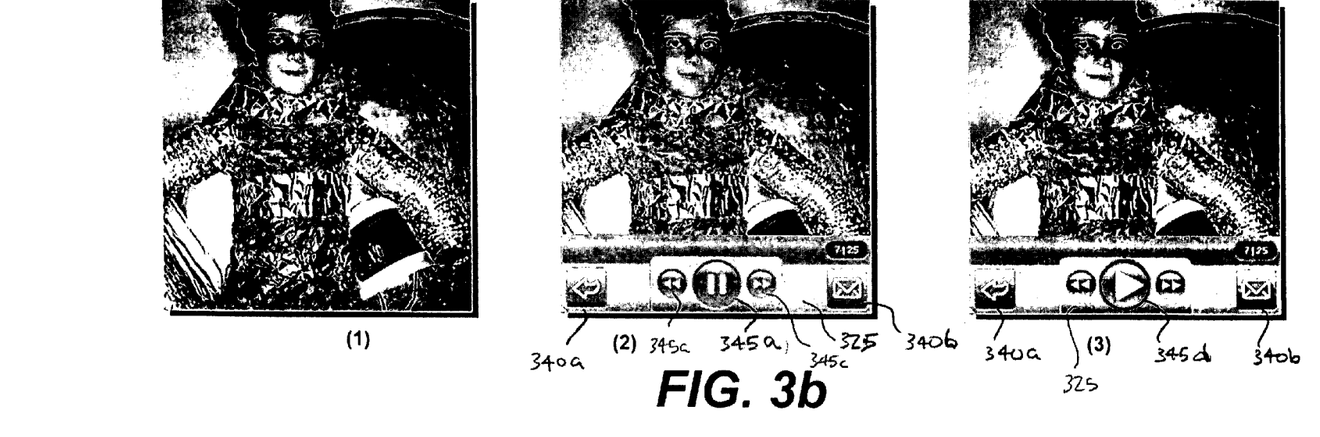

FIGS. 3a and 3b illustrate one embodiment of a master multimedia control mechanism 325 for use with a picture album application in accordance with the present invention. The picture album application executes on the handheld computing device 110. When executed, the picture album application displays on the screen 115.

In this example embodiment, a user may create or have a previously created photo album 305. When the photo album is opened, the contents may be shown as thumbnails 307. In addition, a control panel 325 appears along one boundary of the screen 115, for example, a bottom boundary of the screen 115. In a preferred embodiment, the control panel is along an entire length of the boundary of the screen.

The control panel includes one or more central media control buttons 335 (one is shown in this screen (1)) and one or more outer (edge) control buttons 330a, 330b, 330c (generally 330). The central control button 335 is configured (or adapted) to provide a primary functionality of the media application. In this example of the photo album application, this primary functionality could be a slide show. Thus, the central control button 335 provides a play function to begin playing the slide show, which will be further described with FIG. 3b.

The one or more outer control buttons 330 are configured to be assigned functionality consistent with primary functions of the particular application that is presently being interacted with (e.g., the user is interacting with such application). In the example of the photo album application, the outer control buttons 330 are configured to execute additional functionality for the application. In the photo album example, this additional functionality includes a camera/picture taking function 330a, electronic transmission 330b (e.g., e-mail or messaging), and album management functions 330b, 330c (e.g., photo album selection, sorting, etc.).

Continuing with the example, if a sorting mode, e.g., 330d, was selected to add pictures to the "Family Vacation" photo album, an "Add to Album" screen is displayed with thumbnail pictures that can be added (see screenshot (2)). The user can select a thumbnail and that picture will be added to the "Family Vacation" photo album. The selection can be made through, for example, the screen navigation interface 120 or the keypad 160. If an album selection, e.g., 330c, is selected, a list of available albums is displayed (see screenshot (3)).

Once an album is created and is ready for presentation, the photo album can be placed to a "play" mode. This occurs with the user selection the play button from among the central control buttons 335 on the control panel 325. In FIG. 3a, the play button is the only central control button 335.

With the photo album application changing from the "organization" or "album review" mode to a "play" mode, FIG. 3b illustrates a change in the application interface that reflects the modal change. Specifically, the application can be configured to play a slide show without displaying the control panel 325 as shown in screenshot (1). If the control panel 325 is displayed on the screen, e.g., screen 115, when the slide show is playing, it is configured to be along the same boundary (or location) and the prior control panel. In addition, it is now configured to include additional control mechanisms relevant to the photo album application.

In the illustrated example shown in screenshot (2), central media control buttons 345 now include a large "pause" button 345a and two smaller buttons, one indicating "reverse" 345b and the other indicating "fast forward" 345c. In this embodiment, the control panel 325 is advantageously structured to display the function most likely to be used by the user in this operational mode, the "pause" function, as the largest button. Further, because the control panel 325 is structured along the entire length of the bottom boundary the "pause" button 345a is immediately at a center of the screen. Configuring and placing the "pause" button 345a, and thus corresponding functionality, in this location while in the "play" mode, allows for ease of use because the button readily stands out and can be quickly located and accessed by the user.

If the user selects the "pause" button 345a, the large central button on the control panel 325 changes with this change in operational mode to be configured for a "play" button 345d and corresponding play function. Again, because "play" is the most likely function to be selected when the operational mode is paused, it is assigned the largest button 345d for this mode within the application. When the user selects the "play" button 345d, the operational mode changes again as the slide show resumes and now the large central button once again becomes the "pause" function.

In addition to changes in the central media control buttons 335, the outer media control buttons 330 also change when the application mode changes to "play." In this example, one outer button is used to indicate a "go back" 340a, e.g., to prior mode of album review, while another button maintains an electronic transmission button 340b.

Figures 4, 5:
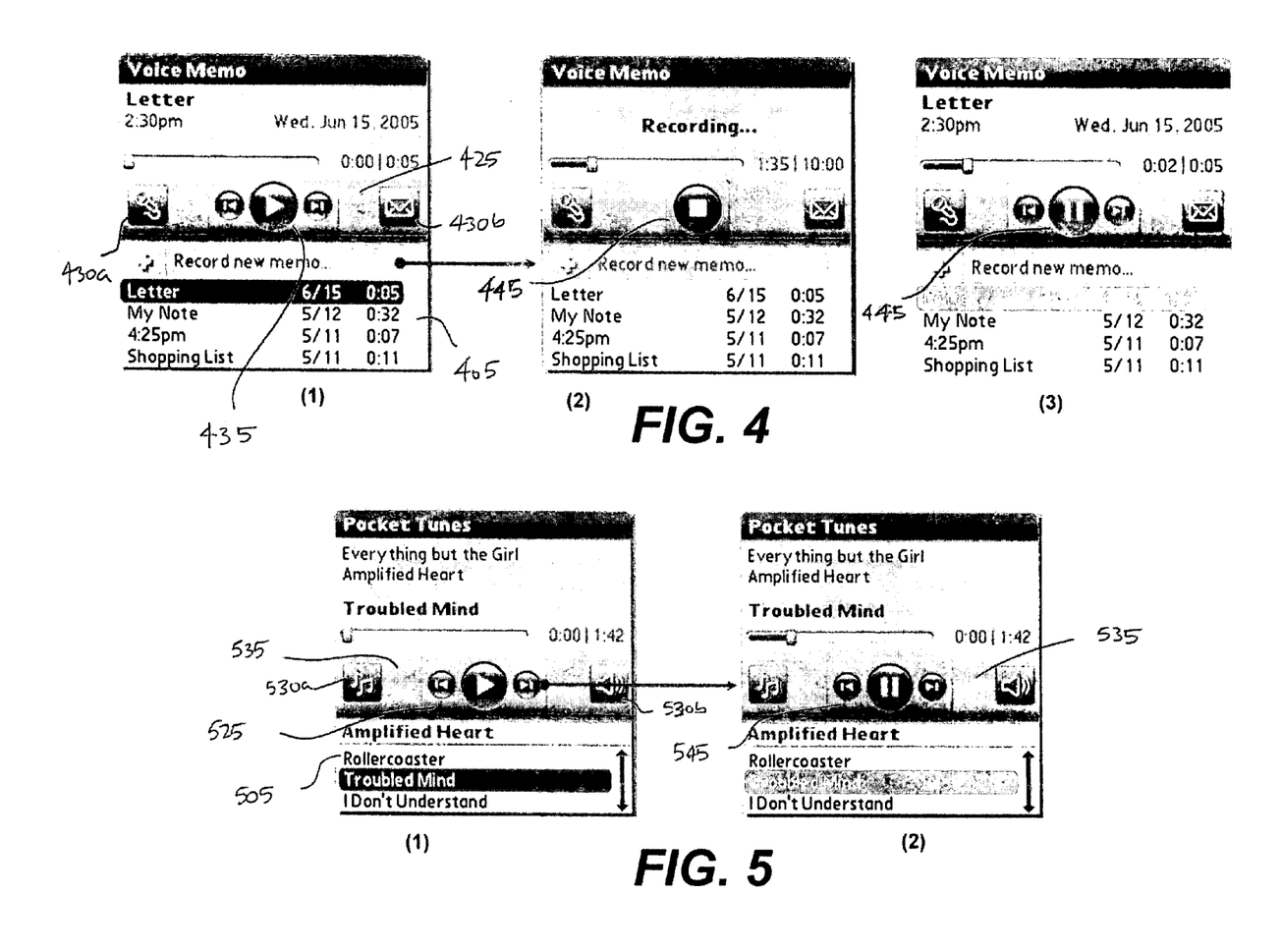
FIG. 4 illustrates one embodiment of a master multimedia control mechanism for use with a voice recorder (or memo) application in accordance with the present invention.
FIG. 5 illustrates one embodiment of a master multimedia control mechanism for use with a music application in accordance with the present invention.

FIG. 4 illustrates one embodiment of a master multimedia control panel 425 for use with a voice memo (or recorder) application in accordance with the present invention. In this example, a voice memo media application is executable on the handheld computing system 110 and when executed the voice memo application displays on the screen 115 of the handheld computing device 110. When launched, the voice memo application includes a media control panel 425 having central media control buttons 435 and two outer media control buttons 430a, 430b.

The central media control buttons 435 are configured to execute functionality associated with the voice memo application. For example, in screenshot (1), the central media buttons include buttons corresponding to previous (selection) (|<), play/record (>), and next (selection) (>|). As previously noted with the photo-album application, the most prominent functionality will be at the center of the media control panel 425, which in this example, is the central media control buttons 435. Moreover, the central media control buttons are configured so that the most prominent function likely to be accessed by a user in this mode, play/record, has the largest surface area for ease of viewing and selection.

As with the photo-album application, the voice memo application media control panel 425 is configured to change as its functionality changes, while still retaining its present location on a screen, e.g., the screen 115. For example, once the play/record button is selected from the central media control buttons 435, media control panel 425 displays a different central media control button 445 the corresponds to functionality most likely to be selected in this mode of the application. In the present example, the central media control button 445 in this mode corresponds to either a stop function as shown in screenshot (2) or a pause function as shown in screenshot (3).

The outer media control buttons 430a, 430b correspond to additional functionality associated with the voice memo application. For example, one button 430a is configured to prepare the application for a new voice recording and another button 430b is configured to electronically communicate (e.g., email or instant messenger) a previously recorded voice message. It is noted that the electronic communication function can be configured to interface an electronic communication application already present on a device, e.g., an application 275 on the handheld computing device 110, through the electronic communication application's existing application programming interface.

In one embodiment, the media control panel 425 is configured for display along a bottom boundary of the handheld computing device 110 screen 115. However, it is noted that the media control panel 425 can be structured to move on the screen 115. For example, if additional media application details are present, e.g., a listing of previously recorded voice memos 405, the media control panel 425 may be re-positioned (or re-rendered) to another location on the screen, such as the center of the screen 115. In this configuration, the boundary changes to a location on the screen to where the additional information window is open. The configuration may be used, for example, to select and electronically communicate previously recorded voice memos, delete messages, or to change message names. When the additional details are no longer needed, the additional details can be hidden from view and the media control panel 425 can be re-positioned back to along the bottom boundary of the screen 115 (not shown).

FIG. 5 illustrates one embodiment of a master multimedia control mechanism for use with a music (or other previously recorded audio file) application in accordance with the present invention. In this example, the music application executes on the handheld computing device 110 and is displayed on the screen 115 of the device 110 In this example media application, the music application, like the voice memo application, includes a media control panel 535 having central media control buttons 525 and outer media control button 530a, 530b. The central media control buttons 525 correspond to the functions most likely to be leveraged by a user when the application initially executes, namely, previous (|<), play (>), and next (>|) as shown in screenshot (1). Once the application transitions to a play mode, the media control panel 535 changes the central media control buttons 545 to display the functions most likely to be leveraged by the user in this mode, namely, previous (|<), pause (||), and next (>|) as shown in screenshot (2).

The outer media control buttons 530a, 530b correspond to additional functionality that is associated with the music application and most likely to be used by a user. For example, one button 530a is configured to provide a music listing and another button 530b is configured to control volume/speaker functions. It is noted that the volume/speaker functions can be configured to interface with a device, e.g., through the audio processing engine 245 of the handheld computing device 110, volume/speaker application programming interface.

As with the voice memo application illustrated in FIG. 4, the music application illustrated in FIG. 5 may include additional data that can be displayed on the screen, for example, a playlist 505. When the playlist 505 is displayed, the media control panel 535 can be configured to move its interface from a boundary along a button of the screen 115 to the center of the screen 115. When the playlist 505 is no longer needed, the media control panel 535 can be configured to be re-rendered along the initial boundary, e.g., the bottom boundary of the screen 115.

Figure 6:
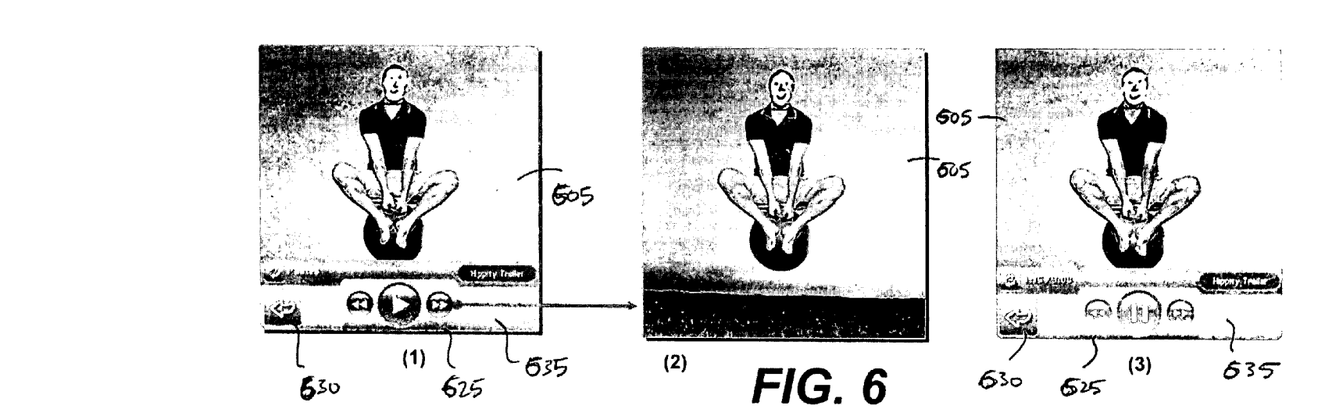
FIG. 6 illustrates one embodiment of a master multimedia control mechanism for use with a video application in accordance with the present invention.

FIG. 6 illustrates one embodiment of a master multimedia control mechanism for use with a video application in accordance with the present invention. The application executed on the handheld computing device 110 and is visible on its screen 115. In this example of a media application, a media control panel 635 includes central media control buttons 625 and an outer media control button 630. In this example, the central media control buttons 625 are configured to provide a user with an interface having common video functions in a mode before any video is selected for viewing, for example, rewind (<<), play (>), and fast forward (>>).

As with the other media applications, the media control panel 635 can be configured to display along a boundary, e.g., bottom boundary of the screen 115 of, e.g., the handheld computing device 110. In addition, as the mode of the video application changes, e.g., from pause (screenshot (1)) to play (screenshot (3), the functional buttons on the center media control buttons 625 change accordingly to provide a user with the functionality most likely to be sought by a user. The video application also includes one or more outer buttons 630, for example, a return to a menu function or an electronic communication function.

Like the other media applications, the media control panel 635 can be configured to move locations on the screen 115, e.g., to the middle of the screen, in order to display more information, e.g., a video list. The media control panel 635 can then reposition (or re-render) itself back along a boundary once there is no need or desire to display the additional information. It is noted that the system can be configured so that a user can customize where the media control panel would be consistently located on the screen 115 for this or any other media application.

In this example embodiment, once the video application is launched and play is selected, the media control panel can be configured to "disappear" from the screen 115 as shown in screenshot (2) so that more area is present to display the video. The media control panel 625 can be configured to re-emerge (or re-render) by selecting a physical button on a device, e.g., a keyboard on the handheld computing device 110, or some other predefined activity, such as "tapping" on a touch screen of a handheld computing device 110.

Figure 7:
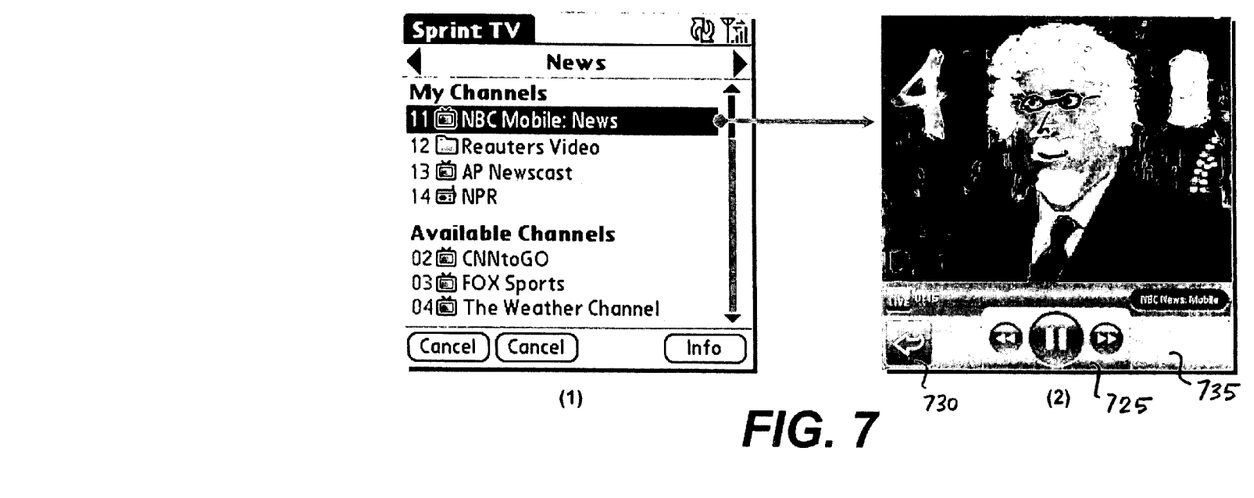
FIG. 7 illustrates one embodiment of a master multimedia control mechanism for use with a broadcast application in accordance with the present invention.

FIG. 7 illustrates one embodiment of a master multimedia control mechanism for use with a broadcast application in accordance with the present invention. The broadcast media application is configured to interoperate with broadcast services such as broadcast television or radio and play on the handheld computing device 10. In the example illustrated, a broadcast television station is illustrated for use with a handheld computing device 10. Once a channel is selected for viewing, e.g., from a list as shown in screenshot (1), the broadcast application is received and a media control panel 735 is rendered.

With the broadcast streaming to the handheld computing device 110, a central media control buttons 725 are configured to provide functionality to rewind (<<), play (>), and fast forward (>>). In this embodiment, the rewind and play media control buttons 725 are configured to allow live video manipulation such as rewind and forward because of buffering capabilities with the device, e.g., in a memory 230 or storage device 225 of the handheld computing device 110. Alternatively, the central media control buttons 725 can be configured so that one rewind and fast forward buttons correspond to channel down and channel up. As with the other media applications, the media control panel 735 includes outer media control buttons 730 that correspond to functionality most likely to be accessed by a user. For example, return to a main channel menu or electronic communications.

The present invention also is configured so that when one or more media applications is operational, the system is configured to display and enable the interface of the media application the user is presently interfacing with. For example, if a user has a video application, a voice memo application and a photo album application executing, the media control panel displayed (or rendered) and enabled is the media control panel corresponding the application that is presently interface. When the user changes the application being presently interface, e.g., going from watching a video in the video application to dictating a voice memo in the voice memo application, the corresponding media control panel changes to display the buttons of the now presently interfaced application, e.g., change from the video control panel 635 to the voice memo control panel 435. Further, the media control panel associated with the presently interfaced media application appears in the same location on a device screen, e.g., the screen 115 of the handheld computing system 110, as the media control panel of the previously interfaced media application. Thus, a user interacting with the system is able to readily locate and interact with the application and have control buttons and functionality displayed that are optimized for the media application presently interfaced.

Each of the media applications described herein can be configured to allow for customization of the control panel by a user. For example, the buttons may be rendered as icons and associated functionality that a user can map together. This allows for greater user flexibility in controlling their media environment. In such instances, the placement of the control panel relative to a screen, e.g., screen 115 on handheld computing device 110, will remain consistent so that a user is able to quickly locate and interact with the media control for the particular media application. This simplifies ease of use and helps enhance productivity since the functionality accessed most commonly is allowed to stand apart from other functions.

Moreover, the present invention can be configured to include an application programming interface through with applications 275 may access the functionality of the media control center and its mechanisms, e.g., 270. The media control center 270 can be structured so that it directly interfaces with the computing system, e.g;, the operating system 265 and system components such as the graphics engine 240 and audio processing engine 245 to exercise control over features such as volume, sound, and the like.

The present invention provides a benefit of having a consistent user interface for control over media applications, which provides ease of understanding and use with respect to each media application. In addition, it relieves programmers of media control applications from the burdens of designing and placing media control panels with their developed media application because the media control panel is independent of the media application. Thus, the application program need only assign functionality to the particular buttons through the appropriate API to associate functionality of the media player with particular buttons on the media control panel.

As recognized through the example of the handheld computing device embodiment described herein, the various embodiments disclosed herein may be implemented using one or more hardware elements. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. The embodiments are not limited in this context.

Various embodiments may be implemented using one or more software elements. In general, a software element may refer to any software structures arranged to perform certain operations. In one embodiment, for example, the software elements may include program instructions and/or data adapted for execution by a hardware element, such as a processor. Program instructions may include an organized list of commands comprising words, values or symbols arranged in a predetermined syntax, that when executed, may cause a processor to perform a corresponding set of operations.

The software may be written or coded using a programming language. Examples of programming languages may include C, C++, BASIC, Perl, Matlab, Pascal, Visual BASIC, JAVA, ActiveX, assembly language, machine code, and so forth. The software may be stored using any type of computer-readable media or machine-readable media. Furthermore, the software may be stored on the media as source code or object code. The software may also be stored on the media as compressed and/or encrypted data. Examples of software may include any software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. The embodiments are not limited in this context.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Some embodiments may be implemented, for example, using any computer-readable media, machine-readable media, or article capable of storing software. The media or article may include any suitable type of memory unit, memory device, memory article, memory medium, storage device, storage article, storage medium and/or storage unit, such as any of the examples described with reference to a memory. The media or article may comprise memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), subscriber identify module, tape, cassette, or the like. The instructions may include any suitable type of code, such as source code, object code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, JAVA, ActiveX, assembly language, machine code, and so forth. The embodiments are not limited in this context.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, use of the "a" or "an" are employed to describe elements and components of embodiments of the present invention. This was done merely for convenience and to give a general sense of the embodiments of the present invention. This description should be read to include one or at least one and the singular also includes the plural unless it is obvious that it is meant otherwise.

Upon reading this disclosure, those of skill in the art will appreciate still additional alternative structural and functional designs for a system and a process for a software configured multimedia control mechanism through the disclosed principles herein. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A computing device including a processor and a memory, the memory storing instructions executable by the processor to implement a software control interface, the software control interface comprising:

a media control panel structured for use with a first media application and a second media application, the first media application and the second media application being stand-alone applications distinct from each other, the first media application adapted to access a first type of media file, the second media application adapted to access a second type of media file, the media control panel structured to include one or more control buttons selected responsive to interfacing with the first media application or the second media application, the one or more control buttons controlling functions of the interfaced media application, the media control panel independent of the first and second media applications, the media control panel displayed along a same boundary of a computer screen.

2. The computing device of claim 1, wherein the first media application includes at least one of a photo album application, a video application, an audio application, and a broadcast media application.

3. The computing device of claim 2, wherein the media control panel includes a single control button configured to provide a plurality of functions.

4. The computing device of claim 3, wherein the single control button is configured to provide a first function corresponding to an advance function and a second function corresponding to a stop function.

5. The computing device of claim 4, wherein the advance function comprises a play function and the stop function comprises a pause function.

6. The computing device of claim 1, wherein the media control panel includes a plurality of central control buttons, at least one central control button configured to be visually larger than other central control buttons of the plurality of control buttons.

7. The computing device of claim 6, wherein the media control panel includes a plurality of outer control buttons.

8. The computing device of claim 7, wherein the outer control buttons correspond to primary application functions for a the first or second media application being presently interfaced.

9. The computing device of claim 8, wherein the first or second media application being presently interfaced is a photo album application and the plurality of outer buttons includes a button structured to initiate execution of an electronic mail application and a button structured to initiate execution of a camera application.

10. The computing device of claim 8, wherein the first or second media application being presently interfaced is a voice recorder application and the plurality of outer buttons include a button structured to initiate execution of an electronic mail application and a button structured to initiate execution of voice recording application.

11. A method to present a media control panel on a computer screen, the method comprising:

interfacing the media control panel with a first media application or a second media application, the first media application and the second media application being stand-alone applications distinct from each other the first media application adapted to access a first type of media file, the second media application adapted to access a second type of media file;

selecting control buttons to include in the media control panel responsive to interfacing with the first media application or the second media application; and displaying the media control panel with the selected control buttons along a same boundary of the computer screen to control a function of the first media application or the second media application interfaced with the media control panel, the media control panel independent of the first and second media applications.

12. The method of claim 11, wherein the media control panel includes a single control button configured to provide a plurality of functions.

13. The method of claim 12, wherein the single control button is configured to provide a first function corresponding to an advance function and a second function corresponding to a stop function.

14. The method of claim 13, wherein the advance function comprises a play function and the stop function comprises a pause function.

15. The method of claim 11, wherein the media control panel includes a plurality of central control buttons, at least one central control button configured to be visually larger than other central control buttons.

16. The method of claim 11, wherein the media control panel includes a plurality of outer control buttons.

17. The method of claim 16, wherein the outer control buttons correspond to primary application functions for the presently interfaced application.

18. A computer readable medium structured to store instructions executable by a processor, the instructions, when executed cause the processor to:

interface a media control panel with a first media application or a second media application, the first media application and the second media application being stand-alone applications distinct from each other the first media application adapted to access a first type of media file, the second media application adapted to access a second type of media file;

select control buttons to include in the media control panel responsive to interfacing with the first media application or the second media application; and display the media control panel with the selected control buttons along a same boundary of the computer screen to control a function of the first media application or the second media application interfaced with the media control panel, the media control panel independent of the first and second media applications.

19. The computer readable medium of claim 18, wherein the media control panel includes a single control button configured to provide a plurality of functions.

20. The computer readable medium of claim 19, wherein the single control button is configured to provide a first function corresponding to an advance function and a second function corresponding to a stop function.

21. The computer readable medium of claim 20, wherein the advance function comprises a play function and the stop function comprises a pause function.

22. The computer readable medium of claim 18, wherein the media control panel includes a plurality of central control buttons, at least one central control button configured to be visually larger than other central control buttons.

* * * * *